Patented Feb. 25, 1936

2,031,719

UNITED STATES PATENT OFFICE 2,031,719

MANUFACTURE OF CONDENSATION PRODUCTS FROM ALCOHOLS AND PHENOLS

Herbert Langwell and Charles Bernard Maddocks, Epsom, England

No Drawing. Application March 15, 1934, Serial No. 715,777. In Great Britain March 17, 1933

8 Claims. (Cl. 260—150)

It is well known that alcohols and substances of a phenolic nature can be condensed by the use of zinc chloride as catalyst. In this condensation sufficient zinc chloride must be used to absorb and retain the water of reaction and since this involves the use of comparatively large amounts of zinc chloride the recovery of the latter is necessary from the economic point of view. It has been generally assumed that it is necessary to use the zinc chloride at elevated temperatures and in the anhydrous condition and the restoration of the recovered zinc chloride to its anhydrous condition ready for re-use has presented a serious obstacle to operating on an industrial scale.

We have found that valuable condensation products are obtainable from phenol or cresoles and the alcohol known as methyl isobutyl carbinol by causing them to react at relatively low temperatures in the presence of zinc chloride that has not been completely dehydrated but only to a concentration of about 80 per cent. corresponding to a boiling temperature of 210° C. at atmospheric pressure.

It may be mentioned that methyl isobutyl carbinol is conveniently obtained by the hydrogenation of mesityl oxide.

The operating temperature in accordance with the present invention is necessarily low in order to avoid decomposition effects and undesirable side reactions such as the dehydration of the alcohol to olefines. A suitable operating temperature is approximately 130° C.

The following is an example of the manner of carrying out the invention using phenol:—Zinc chloride solution derived from a previous operation is heated to approximately 210° C. at atmospheric pressure i. e. 760 mm. of mercury, or at a lower temperature of say 130° C. under a reduced pressure of 70 mm. under which conditions the zinc chloride solution is at about 80 per cent. strength and the specific gravity about 2.2, in order to dehydrate it sufficiently for the purpose in view. This concentrated zinc chloride if produced at about 210° C. as above mentioned is then allowed to cool to such a temperature that after addition of the phenol the resulting temperature is about 130° C.; if on the other hand the concentration takes place at about 130° C. also above mentioned as an alternative, this temperature is maintained while the phenol is added. In either case the temperature of approximately 130° C. is maintained while the methyl isobutyl carbinol (in the proportion hereinafter stated) is added and until the reaction is finished as can be seen by the separation of the reaction products into two distinct layers.

The upper layer constituted by the crude condensation product is separated from the spent or diluted zinc chloride in any convenient way. It may for example be merely run off, or a small amount of water may be added to facilitate the separation into layers. The zinc chloride solution is then regenerated or reconcentrated as above mentioned for reuse, preferably by heating under reduced pressure at about the temperature of the main reaction, namely about 130° C.

A suitable ratio of methyl isobutyl carbinol to phenol for use in the reaction is that represented by a slight excess of phenol over the molecular proportions of these two substances.

The separated condensation product may be washed with a little water to remove any small amount of zinc chloride remaining in it and may then be purified in any known manner, for example by vacuum distillation. Small amounts of by-products or unreacted components arising from the vacuum distillation may be returned to the process.

If during repeated reconcentrations of the zinc chloride a small loss of hydrochloric acid is found to occur, an equivalent amount of fresh acid may be added to compensate for such loss.

What we claim is:—

1. The process of production of condensation products from phenols comprising reacting the phenolic body with methyl isobutyl carbinol with the aid of aqueous zinc chloride of a concentration of about 80 per cent. strength.

2. The process according to claim 1, wherein a reaction temperature of about 130° centigrade is maintained.

3. The process according to claim 1, wherein the zinc chloride used is that derived from a preceding performance of the process claimed but reconcentrated to about 80 per cent. strength.

4. The process according to claim 1, including the step of allowing the reaction products of the process therein claimed to separate into two layers, and thereupon separating said layers.

5. The process of production of condensation products from phenols consisting in mixing the phenolic body with zinc chloride solution of about 80 per cent. strength and with methyl isobutyl carbinols, maintaining the mixture at a temperature of about 130° C. until the reaction is finished as indicated by the capacity of the resultant bodies to separate into two layers, separating into said layers, re-concentrating the lower layer of aqueous zinc chloride solution to about 80 per cent. strength for re-use in the same process, and purifying the upper layer of condensation product.

6. The process of production of condensation products from cresols, comprising reacting the cresol with methyl isobutyl carbinol with the aid of aqueous zinc chloride of a concentration of about 80 per cent. strength.

7. The process of production of condensation products from phenols comprising reacting the phenolic body with methyl isobutyl carbinol with the aid of aqueous zinc chloride of the concentration attained when the concentrating temperature reaches about 210° C. at atmospheric pressure.

8. The process of production of condensation products from cresols comprising reacting the cresol with methyl isobutyl carbinol with the aid of aqueous zinc chloride of the concentration attained when the concentrating temperature reaches about 210° C. at atmospheric pressure.

HERBERT LANGWELL.
CHARLES BERNARD MADDOCKS.